US005629367A

United States Patent [19]

Lofftus et al.

[11] Patent Number: 5,629,367

[45] Date of Patent: May 13, 1997

[54] METHOD OF MAKING PIGMENT CONCENTRATE PARTICLES AND PRODUCT OF SAME

[75] Inventors: Kevin D. Lofftus, Rochester; Alexandra D. Bermel, Spencerport, both of N.Y.

[73] Assignee: Eastman Kodak Company, Rochester, N.Y.

[21] Appl. No.: 381,385

[22] Filed: Jan. 31, 1995

Related U.S. Application Data

[63] Continuation-in-part of Ser. No. 888,064, May 26, 1992, abandoned.

[51] Int. Cl.$^6$ .................................. C08J 3/00; C08K 5/34

[52] U.S. Cl. ............................ 524/88; 524/366; 524/758; 528/494; 528/934; 523/333; 523/339; 430/110; 430/111; 430/137

[58] Field of Search ............................ 524/88, 366, 758; 430/110, 111, 137; 528/494, 934; 523/333, 339

[56] References Cited

U.S. PATENT DOCUMENTS

| | | |
|---|---|---|
| 2,886,559 | 5/1959 | Wiley . |
| 2,932,629 | 4/1960 | Wiley . |
| 2,934,530 | 4/1960 | Ballast et al. . |
| 4,833,060 | 5/1989 | Nair et al. . |
| 4,835,084 | 5/1989 | Nair et al. . |
| 4,912,009 | 3/1990 | Amering et al. . |
| 4,965,131 | 10/1990 | Nair et al. . |
| 5,118,588 | 6/1992 | Nair et al. . |
| 5,262,269 | 11/1993 | Nair et al. . |

*Primary Examiner*—James J. Seidleck
*Assistant Examiner*—Duc Truong
*Attorney, Agent, or Firm*—Anne B. Kiernan

[57] ABSTRACT

A method of making pigment concentrate particles having pigment uniformly dispersed in a polymer and exhibiting a controlled morphology and narrow particle size distribution. The method involves dispersing pigment particles in a pigment dispersant liquid to form a first dispersion phase; blending the first dispersion phase with a binder to produce a second dispersion phase; mixing the second dispersion phase under sufficient shear to produce a suspension of small dispersion phase droplets in an immiscible suspending liquid; allowing the small dispersion phase droplets in the suspension to coalesce to a larger size at which substantially no further coalescence can occur; mixing the suspension of coalesced droplets with an extracting liquid to remove the pigment dispersant liquid from the coalesced droplets; and isolating the resulting pigment concentrate particles.

23 Claims, No Drawings

METHOD OF MAKING PIGMENT CONCENTRATE PARTICLES AND PRODUCT OF SAME

The present application is a continuation-in-part of U.S. patent application Ser. No. 07/888,064 to K. D. Lofftus, entitled "SOLVENT EXTRACTION IN LIMITED COALESCENCE PROCESSES," filed May 26, 1992, now abandoned.

FIELD OF INVENTION

The present invention relates to a method of making pigment concentrate particles that are useful, for example, in the manufacture of electrostatographic or electrophotographic toners. More specifically, this invention relates to a solvent extraction limited coalescence method for making pigment concentrate particles comprising a pigment uniformly dispersed in a polymer and having a controlled morphology and narrow particle size distribution.

BACKGROUND OF THE INVENTION

Electrostatography broadly includes the forming and developing of electrostatic image patterns either with or without light exposure through the use of an electrostatically charged toner composition. It includes electrophotography, as used, for example, in office copying machines, as well as processes such as dielectric recording which require no light exposure.

A principal type of electrostatically chargeable toner composition for such processes is a dry fusible powder composed mainly of a thermoplastic, i.e., polymer, binder resin and a colorant such as carbon black or an organic pigment or dye. This kind of dry toner powder is normally used in a developer composition in admixture with carrier particles (usually larger in size than the toner particles). These triboelectrically charge the toner particles so that they can be electrostatically attracted to oppositely charged areas of an electrostatic latent image to develop the image, the toner thereafter being transferred to and fixed by fusion or other means to an image receiving sheet, e.g., a sheet of paper.

The facilitation of pigment dispersion in polymers is an ongoing problem in the manufacturing of electrostatographic toners since the dispersion quality of pigment in toner affects toner performance in several ways. Typically, as the pigment dispersion quality improves, the spectral density (Dmax) of the toner increases and the amount of unwanted spectral absorption of the toner decreases, resulting in an improved system color gamut. Further, as the pigment dispersion quality improves, the amount of pigment needed in the toner decreases resulting in a decrease in the cost of the toner. The toner also becomes more uniform as the pigment dispersion quality improves, and this uniformity is desirable to ensure optimum performance. Therefore, improved dispersion of pigments is desired to increase the variety of colors available for use in color copiers. Most pigments are formed via a precipitation process. The precipitation step, as well as subsequent purification and isolation steps, can lead to agglomeration thereby necessitating the dispersion of the pigment in the product to which it is applied. Currently, pigments that are difficult to disperse are either purchased as flushes or compounded at high pigment concentrations with polymers. Neither of these techniques produce the desired degree of pigment dispersion.

The desired degree of pigment dispersion can be achieved by milling in solvents that reduce pigment particle cohesion.

Alternatively, the pigment in its precipitation or purification liquor may be used if no agglomeration has occurred. The resulting dispersion can be metered into extruders capable of handling liquid feed. Since most of the feed stock to an extruder produces toner solids, two separate feeds must be maintained in an exact ratio to obtain the desired pigment loading if solvent mill pigment is to be fed directly to the extruder. Furthermore, the milling of pigments in solvents causes problems in storage and addition of milled pigments to compounders for conventional toners. Further, pigment suspensions have a limited shelf life and require ventilated storage. Although solutions and suspensions can be added to extruder type compounders, modification of the building support is needed to accommodate the health and environmental hazards of solvent vapors.

The pigment dispersion may be "let down," i.e., diluted in a manner that preserves the degree of dispersion, in a polymer solution and dried to obtain a pigment concentrate with a long shelf life. However, pan drying of the solution/dispersion requires long drying times, high heats, and produces very thin films of material necessitating comminution before use. Also, a residual level of solvent in pan-dried pigment concentrate is difficult to remove by drying and the modifications to the building support service described above may still be needed. Other techniques such as drum driers may be used to automate pan drying but have the same drawbacks as described above.

Dry or particulate toner powders in which the pigment is dispersed can be prepared by a variety of techniques. One technique that takes advantage of milling pigments in solvent to obtain high dispersion qualities is limited coalescence. Limited coalescence toners are formed by dispersing an oil or organic phase (which contains a pigment or dye) in an aqueous media in the presence of colloidal stabilizers. The purpose of the stabilizer is to control the size by preventing the coalescence of the emulsion once the required size has been attained. Therefore, the size of the colorant particle formed by this technique is related to the amount of colloidal stabilizer, e.g., silica, present in the aqueous phase. The monomer is polymerized to form solid colorant containing polymeric particles that are separated and dried. The process is only useful (in practice) for making very small particle size toner powders (under about 15 microns) that can be employed in making high resolution developed toner images. The suspension limited coalescence process is described, for example, in U.S. Pat. Nos. 2,932,629 and 4,835,084.

Another example is an evaporation limited coalescence process, where the stabilizer used is also a colloidal silica, or the like, and where the suspended small droplets comprises a solution of polymer in a non-aqueous, water immiscible solvent liquid. The solvent is removed by evaporation and the particles are separated, washed and dried. Such a process is disclosed in U.S. Pat. No. 4,833,060 to Nair et al. ("Nair"). The limited coalescence technique described in Nair involves first forming a solution of a polymer in a solvent that is immiscible with water (along with any required addenda), and then suspending the polymer-solvent solution in water containing a promoter and a colloidal suspension stabilizer. The resulting suspension is subjected to high shear action to reduce the size of the polymer-solvent droplets. The shearing action is removed and the polymer-solvent droplets, with particles of stabilizer at their surface, coalesce to the extent allowed by the stabilizer to form coalesced polymer-solvent droplets. After the drop size has been determined by the limited coalescence, the solvent must be removed from the coalesced drops to form the solidified polymer particles which are then isolated from the suspension by filtration or other suitable means.

The Nair technique is referred herein to as evaporative limited coalescence ("ELC") whereby the particles are formed from a water immiscible solution or dispersion. In an "inverse" limited coalescence process, the particles are formed from a water or water-miscible solution or dispersion suspended in an immiscible hydrophobic liquid containing a colloidal suspension stabilizer. This inverse method is useful for producing particles having a narrow size distribution and controlled morphology from hydrophilic materials such as precursor to ferrites, ceramic powders, or water soluble polymers. Both techniques are useful to obtain powders with desirable handling properties (e.g., high powder flow, low dusting, etc.). Inverse limited coalescence is described in U.S. patent application Ser. Nos. 07/888,063 and 08/309,431, to K. D. Lofftus, both entitled "INVERSE LIMITED COALESCENCE PROCESSES", filed May 26, 1992 and Sep. 20, 1994, respectively.

A disadvantage, however, of solvent removal by evaporation is that evaporation of the solvent or dispersant, is a slow, time consuming process. In addition, many potential ELC systems are not sufficiently robust to withstand the stirring and heating that is required to complete the evaporation process and solidify the coalesced droplets. The agitation and heat destabilize the coalesced droplets before they are solidified, causing breakdown of the stabilized interface and agglomeration of the particles.

Solutions of polymer containing dispersed pigments can be formed into controlled particles using ELC while avoiding the comminution step (see U.S. Pat. Ser. No. 4,833,060). However, in practice, ELC is only able to produce toner particle sizes which dust badly and do not blend well with polymers before compounding. To solve this deficiency, a solvent extraction limited coalescence ("SXLC") technique as described in co-pending U.S. patent application Ser. No. 07/888,064 to K. D. Lofftus, filed May 26, 1992, was developed to rapidly remove the solvent and provide larger particles.

Larger particles made by SXLC contain less of the colloidal stabilizer which may act as a contaminant in later processes. In ELC toner production, it was found that colloidal silica stabilizer had to be removed, but latex stabilizers could be left on the particle surface. However, polymers made by polymerization limited coalescence ("PLC") can be larger in size and it has been found that the level of silica contamination does not adversely affect toners made by compounding these polymers with the silica in place. U.S. Pat. Ser. Nos. 4,912,009 and 4,965,131 are representative of polymerization limited coalescence methods employed in toner manufacture.

It is clear that there remains a need to provide a method of producing a dry form of pigment dispersion and a novel powder form of pigment which overcome the above-described deficiencies in the art.

SUMMARY OF THE INVENTION

The method of the present invention produces pigment concentrate particles exhibiting controlled morphology and particle size distribution. The present invention provides numerous advantages over earlier conventional methods of producing pigment concentrate particles, e.g., drum drying, flushing (i.e., the direct transfer of pigments in an aqueous phase, as they emerge from synthesis, to a nonaqueous phase without previous drying and milling the colorant), etc., such as providing better pigment blending, exhibiting less dusting, and producing particles of more uniform particle size distribution ("PSD"). The present method also has a distinct advantage over previous limited coalescence techniques such as ELC by greatly reducing the time required to remove the dispersant from the coalesced droplets by eliminating the need to evaporate the dispersant. In addition, this advantage allows processing of less robust droplets that could not ordinarily withstand the heat or agitation required to evaporate the dispersant.

More specifically, the present invention relates to a method of making pigment concentrate particles comprising a pigment uniformly dispersed in a binder and having a controlled morphology and narrow particle size distribution for use in the manufacture of electrostatographic or electrophotographic toners.

The present method involves first dispersing sub-micron sized pigment particles in a pigment dispersant liquid to form a first dispersion phase. The first dispersion phase is then blended with a binder to produce a second dispersion phase. The second dispersion phase is mixed under sufficent shear to produce a suspension of small dispersion phase droplets in an immiscible suspending liquid, wherein the suspension contains a stabilizer which limits the dispersion phase droplets' coalescence, and wherein the suspending liquid and the second dispersion phase are sufficiently immiscible to form two phases. After allowing the small dispersion phase droplets in the suspension to coalesce to a larger size at which substantially no further coalescence can occur, the pigment dispersant liquid is removed from tile suspension of coalesced droplets by mixing with a sufficient amount of an extracting liquid, wherein the extracting liquid is sufficiently miscible with the second dispersion phase to allow diffusion of the pigment dispersant liquid from the coalesced droplets, but immiscible enough with the second dispersion phase as to not disrupt the stability of the coalesced droplets. Following the removal of the pigment dispersant liquid, the droplets form substantially solidified pigment concentrate particles having a controlled morphology and narrow particle size distribution. Finally, the pigment concentrate particles are isolated.

The product of the invention is the resulting electrophotographic toner produced from pigment concentrate made by the method of the present invention. The toner particles are made by compounding the pigment concentrates with polymer, charge control agent, and other toner addenda followed by grinding. The toner particles produced by the method of the present invention exhibit superior color saturation and optical gain, i.e., reciprocal of the toner weight per unit area times the percent pigment contained in the toner required to obtain a transmission density of one ($cm^2$·decade/g·%).

The invention provides a means to produce a dry pigment concentrate from a wet milled pigment dispersion (or from a precipitation or purification liquor containing a pigment) in which the dispersion can be maintained and excellent covering power, i.e., optical gain, achieved when compounded with polymers specifically in the form of electrophotographic toners. The advantages of this method are: (1) conversion of liquid pigment dispersions to dry concentrates without heating of solvents to form a concentrate; (2) long shelf life of dry concentrate; (3) formation of controlled particles without grinding for improved dry blending with other ingredients; (4) rapid production capabilities; (5) variable pigment concentrations that have no effect on the dispersion quality; and (6) maintaining accurate blend ratios due to low dusting where two or more pigments are required to obtain desired product hue.

DETAILED DESCRIPTION OF THE INVENTION

The term "particle size" as used herein, means volume weighted diameter as measured by conventional diameter measuring devices, such as the Coulter Multisizer, sold by Coulter Electronics, Inc. Mean volume weighted diameter is the sum of the mass of each particle times the diameter of a spherical particle of equal mass and density, divided by total particle mass.

The term "pigment" or "pigment particles" as used herein, refers to a finally divided solid that is usually substantially insoluble in water and organic solvents and that has a positive colorant value (black, white, or colored). A pigment imparts a color to another substance, such as toner powder.

In accordance with the present invention, a method of making pigment concentrate particles having a controlled morphology and narrow size distribution is provided. Although the present method can find application in the production of any suitable material requiring the dispersion of pigment or colorant therein, the present method will be described below in detail relative to pigment concentrate particles formed for use in the production of electrographic toner.

The present method involves first dispersing sub-micron sized pigment particles in a pigment dispersant liquid to form a first dispersion phase. The first dispersion phase is then blended with a binder to produce a second dispersion phase. The binder can be a polymer, a wax, a polymer-solvent solution, or any other suitable compound which, when mixed with the first dispersion phase, will allow the formation of a second dispersion phase. The second dispersion phase is mixed under shear to produce a suspension of small dispersion phase droplets in an immiscible suspending liquid, wherein the suspension contains a stabilizer which controls the dispersion phase droplets' coalescence, and wherein the suspending liquid and the second dipsersion phase are sufficiently immiscible to form two phases. After allowing the small dispersion phase droplets in the suspension to coalesce to a larger size at which substantially no further coalescence can occur, the pigment dispersant liquid is removed from the suspension of coalesced droplets by mixing with a sufficient amount of a extracting liquid, wherein the extracting liquid is sufficiently miscible with the second dispersion phase to allow diffusion of the pigment dispersant liquid from the coalesced droplets, but immiscible enough with the second dispersion phase as to not disrupt the stability of the coalesced droplets. In other words, the suspending liquid and the second dispersion phase are immiscible enough to form two sufficiently immiscible phases such that the stabilizer will migrate to the interface between the second dispersion phase and the suspending liquid, but are sufficienly miscible to promote the diffusion of the pigment dispersant liquid from the coalesced droplets upon addition of the extracting liquid. Following the removal of the pigment dispersant liquid, the droplets form substantially solidified pigment concentrate particles having a controlled morphology and narrow particle size distribution. Finally, the pigment concentrate particles are isolated.

In accordance with this invention, pigments are milled with a pigment dispersant liquid such as ethyl acetate, water, methylene chloride, or other suitable solvent, to obtain dispersion and size reduction. Any type of milling technique known to the art, e.g., shaking, tumbling, salt milling, or preferably agitated media milling, can be employed. An amount of binder that is compatible with the final product to be used in forming the toner, preferably 10 percent of the solids in the pigment dispersion, can be dissolved in the pigment dispersant liquid to increase the viscosity and improve the efficiency of milling. For some pigments, a surfactant is added to maintain the dispersion in the pigment dispersant liquid, e.g., an amine terminated polyester (commercially available as Solsperse 24000™). Alternatively, a pigment in its precipitation or purification liquor may be used if little agglomeration was induced by the above-mentioned processes and if sufficient purity is achieved.

The dispersion of pigment is then let down in an equivalent binder to obtain a separation between pigment particles when the pigment dispersant liquid is removed. The separation between pigment particles must be great enough to prevent agglomeration. Additionally, the separation must be sufficient to prevent local shear strengthening so that the shear generated in the compounding device can further disperse and dilute the pigment in the toner binder. On the other hand, the pigment concentration must be maximized to reduce processing and storage requirements. For high shear devices, the pigment concentrations may be as great as 60 percent by weight while low shear devices such as twin screw extruders require a lower pigment concentration.

Once let down in a binder, the usually lower-density, hydrophobic second (pigment) dispersion phase, is suspended in an immiscible suspending liquid medium of approximately three times the second dispersion phase weight. A colloid with a balanced hydrophobic-hydrophilic nature is present in the immiscible suspending liquid. The hydrophobic-hydrophilic nature of the colloid, which is maintained by the colloid composition itself and the pH of the (usually hydrophilic) immiscible suspending liquid, allows the interspersal of the colloid between the second dispersion phase and the immiscible suspending liquid (phase) so that the colloid is preferentially adsorbed at the interface between these two phases. Buffer salts may be used to control the pH. Additionally, surfactants may be used to modify the hydrophobic-hydrophilic balance of the colloid if desired. Examples of commercially available silica colloids that can be used in the method of the present invention are LUDOX™ supplied by E. I. du Pont de Nemours & Co. and NALCOAG 1060™ supplied by Nalco Chemical Company. Also, organic colloids such as those disclosed in U.S. Pat. Ser. No. 4,965,131, which disclosure is hereby incorporated by reference, may be used.

The adsorption of the colloid at the two-phase interface prevents further coalescence of droplets of the second dispersion phase/immiscible suspending liquid suspension and determines the droplet size and hence the particle size following pigment dispersant liquid removal. The degree of mixing needed to obtain the suspension must be sufficient to break up the droplets to below the final desired droplet size. Increasing the mixing to the level where the difference between the largest droplets produced by this breakage is significantly less than the final droplet size after coalescence minimizes the width of the final PSD. However, for a powder to be compounded, the particle size distribution width is not important and lower mixing energies can be used.

The amount of colloid in the immiscible suspending liquid can be adjusted to produce an average particle size from about 3 up to about 60 microns, preferably between about 20 up to about 40 microns. Smaller sizes result in excessive pigment loss, e.g., due to dust in handling and pre-blending with polymer and toner addenda before compounding, where larger particles require greater mixing capability in the compounding device to achieve uniform pigment loading in the toner particles. Before pigment dispersant liquid removal, the droplets size is approximately 1.4 times that of the particle depending upon the percentage of solids in the second pigment phase. For larger particles, less intense dispersion energy is needed to generate limited coalescence ("LC") droplets and is preferred to prevent coagulation due to the rupturing of the stabilized interface by high collision energies.

The amount of fine particles is minimized by the lower dispersion energy. However, wider PSD's result from coalescence of larger droplets which are produced by the reduced breakage of droplets at lower dispersion energies. As discussed above, the point at which the PSD width is increased occurs when the droplet size due to breakage is a significant fraction of the final droplet size. For LC pigment concentrates, the PSD width is of importance only in that the fine particles below 20 μm are minimized.

Another source of fine particles is broken droplets left uncoalesced as the majority of the droplets reach the final limited size. This occurs when the ratio of the second dispersion phase to immiscible suspending liquid phase is low and is caused by the relatively greater rate of collisions between larger droplets, as compared to the collisions between small and large droplets, as coalescence proceeds. This mechanism of producing fine particles is more important as the target particle size is increased due to decreased suspension viscosity which allows the fine particles to escape collision and coalescence with larger particles. As stated above, the preferred ratio of second dispersion phase to immiscible suspending liquid phase is 1 to 3 by weight to minimize the number of fine particles produced by the process.

Straight ELC cannot be used to recover larger particles because the momentum imparted by stirring during the evaporation step is sufficient to rupture some of the stabilized droplet interfaces thereby causing coagulation and creaming of the low density (usually hydrophobic) phase. SXLC avoids coagulation by rapidly removing the pigment dispersant liquid near the droplet surface to form a tough polymer shell. The pigment dispersant liquid in the center of the particle can be removed by solvent extraction ("SX") provided that gentle stirring is used to prevent agglomeration (since the surface of the particles soften due to the diffusion of solvent from the core). The amount of time necessary to remove the pigment dispersant liquid decreases with decreasing particle size, while stirring may also become unnecessary.

For conventional LC, the SX technique produces larger volumes of extracting liquid (usually water) to be treated for the removal and recovery of the pigment dispersant liquid, i.e., a solvent, as compared to ELC. This disadvantage can be compensated for by combining SXLC and ELC with SXLC creating the polymer shell around the droplet and ELC removing the solvent from the core of the particles. This mixed SXLC/ELC method increases production capacity (by reducing volumes) over that of the SXLC method while reducing batch time over that for the ELC method. In production practice, the volume required for SXLC can be reduced by rapidly cycling the immiscible suspending liquid (containing solvent) through membrane solvent extraction columns thereby effectively replacing the process achieved by evaporation.

The particles can be recovered from the suspension by any method known to the art, e.g., sedimentation or filtration. Filtration is generally used after sedimentation to remove excess solvent extraction liquid before drying. Sedimentation can be done in the evaporation/SX vessel to conserve resources. Additionally, continuous production can be developed when the evaporation/SX or separate sedimentation vessel is used as a thickener.

After the particles are recovered, the buffer salts (typically used in conventional LC) and high boiling point solvents (often used in inverse LC) need to be removed in a washing stage, e.g., by subsequent steps of re-suspension and sedimentation or filtration. The buffer salts are more effectively removed before the particles are dried. Also, since some products may not be sensitive to the buffer salts, this washing stage can be avoided. For products sensitive to the colloidal stabilizer, the step to remove the colloid, e.g., KOH washing for silica, is done before the washing step. Alternative methods of washing are washing in place on a filter without re-suspension, centrifugation, and flotation.

In conventional LC, flotation concentrates the particles to a reasonable weight percent of solids to facilitate filtration while providing washing of the buffer salts. The counter current plug flow process of flotation columns is a preferred means of reducing the required production space necessary for washing.

As to the particulars of the solvent extraction process, the quantity of pigment dispersant liquid is important in that as the amount of pigment dispersant liquid is increased, the resultant size of the particles prepared under given agitation conditions will decrease. Generally, higher concentrations of solids in the pigment dispersant liquid produce larger particle size powder particles having a lower degree of shrinkage than those produced by lower concentrations of solids in the same pigment dispersant liquid. The concentration of the solid materials in the pigment dispersant liquid should be from about 1 to about 80 and preferably from about 2 to about 65 weight percent.

The dispersion of binder in pigment dispersant liquid (the "second dispersion phase" of the system) is introduced into an suspending liquid which is substantially immiscible with the second dispersion phase and contains a colloidal stabilizer. The weight ratio of the second dispersion phase to suspending liquid must be sufficiently small to cause the second dispersion phase to form a discontinuous phase within the suspending liquid (phase) upon shear mixing. However, the weight ratio should be maintained at a high level so that the specific process capacity (the unit weight of particles produced per unit volume of process equipment) is optimized. Another objective of maintaining a high weight ratio of second dispersion phase is to increase the collision rate of very small droplets produced by shearing relative to larger droplets so that a narrow size distribution may be obtained. For low density dispersions such as those used for making concentrates of organic pigments in polymers, a weight ratio of second dispersion phase to suspending liquid in the range from about 0.1 to about 0.4, preferably from about 0.25 to about 0.35, is generally maintained. High density dispersions, such as those used for making inorganic pigment concentrates, generally are used at a weight ratio of about 0.3 to about 0.65, preferably from about 0.4 to about 0.6.

The stabilizer serves to surround the dispersion phase droplets during the subsequent shear mixing of the second dispersion phase and the suspending liquid phase. The stabilizer limits the coalescence the dispersion phase droplets can undergo upon removal of the shearing force.

To achieve this effect, it is generally desired to control the pH of the hydrophilic phase to regulate the charge and hydrophilicity of ionizable stabilizers. When water constitutes the hydrophilic phase, the pH should be maintained at about the $pk_a$ to $pk_a+5$, preferably $pk_a+1$ to $pk_a+4$, for colloids with an acid group. Likewise, the pH should be maintained at $14-pk_b$ to $9-pk_b$, preferably $13-pk_b$ to $10-pk_b$ for colloids having basic groups. Amphoteric colloids may be used in a pH range of 5 pH units either side of the stabilizer's isoelectric point, preferably 1 to 4 pH units from the isoelectric point. For silica, the isoelectric point is about 2 and the pH is generally maintained between at a value of from about 2 to about 7, preferably from about 3 to 6 and most preferably 4. $pk_a$ is a value representing the extent of dissociation of a stabilizer's acid group and is defined by the base 10 logarithm of the inverse of the equilibrium constant of the acid dissociation. Likewise, $pk_b$ is a value representing the extent of dissociation of a stabilizer's base group and is defined by the base 10 logarithm of the inverse of the equilibrium constant of the base dissociation. The isoelectric point is the pH value where all the charges on the stabilizer added together are net neutral.

Suitable concentrations of stabilizer are, generally, from about 0.1 to 70 g per 100 g of solids in the second dispersion phase, preferably from about 2 to 35 g per 100 g of solids for silica stabilizers. Latex stabilizers are generally used in concentrations from about 0.1 to 10 g per 100 g of solids in the second dispersion phase, preferably from about 0.5 to 5.0 g per 100 g of solids in the second dispersion phase. Microgel stabilizers are generally used in concentrations from about 0.5 to 50 g per 100 g of solids in the second dispersion phase, preferably 1.0 to 25 g per 100 g of solids in the second dispersion phase. Further details regarding the use of stabilizers in limited coalescence processes can be found in U.S. Pat. No. 4,965,131 to Nair, et al., U.S. Pat. No. 4,833,060 to Nair, et al., and U.S. Pat. No. 4,758,492 to Nair, the disclosures of which are hereby incorporated by reference. The size of the coalesced droplets ultimately formed depends on the amount of the stabilizer employed. As the quantity of stabilizer added to the system increases, the size of the coalesced droplets will generally decrease.

Optionally, depending on the stabilizer used, a promoter can also be added to the immiscible suspending liquid. If used, the promoter should be present in an amount of about 1 to about 10 percent and preferably from about 2 to about 7 percent based on the weight of the second dispersion phase.

The second dispersion phase is mixed with the immiscible suspending liquid under (shearing) agitation. The agitation phase conditions must be great enough to break the second dispersion phase into droplets smaller than the droplets formed after limited coalescence has occurred. Additionally, the temperature must be maintained sufficiently low to prevent heating and local cavitation in the agitation zone.

During this agitation step, the dispersion phase droplets are dispersed and reduced in size in the suspending liquid in an agitation zone and, upon exiting this zone, a suspension of small dispersion phase droplets in the suspending liquid is formed. Each of the small dispersion phase droplets are surrounded by stabilizer particles which limit and control both the size and size distribution of the small, dispersion phase droplets as they coalesce. The shear in the agitation zone must be sufficient to break the second dispersion phase into droplets smaller than that achieved after limited coalescence. For pigment concentrates, where very narrow PSD's are not required, agitation that breaks the dispersion phase into droplets approximating or slightly smaller than the mean particle size after limited coalescence is sufficient. Pigment concentrates produced by such agitation conditions will have a broader distribution about the mean particle size than those formed under high shear conditions. In addition, these pigment concentrates (as contrasted with concentrates made by other methods, e.g., compounding, grinding, or flushing) will not form undesirable particles with substantially smaller particles than average (sometimes referred to as "dust" or "fines") typically generated by convention comminution responsible for dust during handling of pigment concentrates. Preferably, the small stabilizer-controlled droplets are allowed to coalesce to a larger size at which substantially no further coalescence can occur, as controlled by the stabilizer particles present on the surface of the small droplets. While any agitation device is applicable to the process of this invention, it is preferred that the second dispersion phase be mixed with the immiscible suspending liquid in a stirred vessel and then introduced into the extracting liquid using a centrifugal-type pump with "throttling," e.g., via a partially opened valve, to produce sufficient shear.

After the droplets of dispersion phase have been subjected to agitation, the pigment dispersant liquid must be removed from the coalesced droplets. In accordance with the present invention, the suspension containing the dispersion phase droplets is mixed with a sufficient amount of an extracting liquid to cause the pigment dispersant liquid to diffuse from the coalesced droplets into the extracting liquid. Enough pigment dispersant liquid must be removed at this step to allow solidification of the coalesced droplets. That is, the viscosity of the coalesced droplets must be raised sufficiently to prevent agglomeration of the solidified particles during subsequent isolation steps. Gentle agitation should be maintained during the extraction process so that the droplets are continually exposed to fresh extracting liquid so that the pigment dispersant liquid continues to diffuse into the extracting liquid. The time required for the pigment dispersant liquid to diffuse out of the droplet increases as: (1) the droplet size increases, (2) the porosity of the stabilizer decreases, and (3) the concentration of the pigment dispersant liquid dissolved in the extracting liquid increases.

The amount of pigment dispersant liquid removed is dependent on the subsequent isolation steps. For example, if the solidified particles are isolated from the suspension by filtration, a higher degree of solidification will be required to increase the "robustness" of the coalesced droplets (i.e., resistance to agglomeration or coalescence past the limit as controlled by the stabilizer) due to the mechanical stress of filtration. On the other hand, if the solidified particles are separated by sedimentation, the particles need not be as thoroughly solidified.

The extraction can be performed in a variety of ways. The exact method of performing the extraction step will depend on the goals of the limited coalescence process as well as on the choice of materials in the limited coalescence system. Initially, sufficient extracting liquid to remove all the pigment dispersant liquid required can be added as a single batch extraction. A single batch extraction is useful when the extracting liquid and the pigment dispersant liquid have relatively high mutual miscibilities, when the dispersion phase droplets are less robust, and when relatively small scale production is undertaken.

Another mode of extraction is by multiple stage batch extraction. Multiple stage extraction is advantageous when a large amount of extracting liquid is required to complete the extraction step (e.g., when the extracting liquid and the pigment dispersant liquid have relatively low mutual miscibilities or in relatively large scale production). Multiple stage extraction requires droplets with a higher degree of robustness because a separation step (e.g., filtration or sedimentation) must be performed after each stage. Multiple stage extraction can be performed using either the same or different extracting liquids in each step. For example, it may be advantageous to use a different extracting liquid after the particles have become more robust due to the removal of pigment dispersant liquid in previous stages. A cosolvent or a new, more miscible, extracting liquid can be used to speed up extraction without destabilizing the coalesced droplets. This method is very useful when the immiscible suspending liquid or the initial extracting liquid is difficult to remove by evaporation.

A third way of performing the extraction step is by continuous extraction. Continuous extraction is performed, for example, by providing a continuous stream of extracting liquid that mixes with a continuous stream of the suspension. The resulting mixture can be deposited directly to the separation apparatus (e.g., filter). This method dispenses with the need of extracting pigment dispersant liquid in separate, discrete batches and is useful in very large scale production.

The various methods of performing the extraction step can be performed in any combination to suit the goals of the particular limited coalescence process. In addition, the extraction methods can also be used to perform an initial, bulk removal of pigment dispersant liquid with the remaining pigment dispersant liquid removed by conventional means such as evaporating, vacuum drying, or oven drying.

As stated above, the extracting liquid can be the same as the suspending liquid, a liquid miscible with the suspending liquid that has a mutual miscibility with the pigment dispersant liquid, or a cosolvent solution which is miscible in both the pigment dispersant liquid and the suspending liquid. Preferably, the extracting liquid and the suspending liquid are the same to simplify waste disposal and separation. If a cosolvent is used, it preferably exhibits a hydrophilic nature between that of the pigment dispersant liquid and suspending liquid. If the extracting liquid is the same as the suspending liquid, the liquid used must exhibit some mutual miscibility with the pigment dispersant liquid. As noted above, preferably, the suspending liquid and the pigment dispersant liquid are immiscible enough to promote good limited coalescence (i.e., form two sufficiently immiscible phases such that the stabilizer will migrate to the interface between the second dispersion phase and the suspending liquid), but are as sufficiently miscible as possible to promote diffusion of the pigment dispersant liquid from the coalesced drops upon addition of an extracting liquid.

The amount of extracting liquid that must be added to remove a given amount of pigment dispersant liquid from the coalesced droplets depends on the mutual miscibility of the extracting liquid and the pigment dispersant liquid, the rate of diffusion of the pigment dispersant liquid from the droplets to the extracting liquid, and the number of steps in the extraction process. Mutual miscibility data for various useful substituents such as those described herein is available in the literature or can be obtained by experimental procedures known in the art. The miscibility for the pigment dispersant liquid in the suspending liquid should be 0.5 to 25, preferably 1 to 10, wt %. The pigment dispersant liquid should be at least 2, preferably, 5 wt % miscible in extracting liquid.

Although removal of stabilizer is not necessary in the present invention, should it be desired, the stabilizer can be removed from the surface of the particles by any suitable technique. Silica stabilizers can be dissolved in hydrogen fluoride or other fluoride ion or, preferably, by adding an alkaline agent such as potassium hydroxide to the suspension containing the particles. Many inorganic stabilizers can be dissolved in acid solutions provided the pigment does not react with the solution. After removing the stabilizer, the particles can be recovered by filtration and finally washed with water or other agents to remove any desired impurities from the surface of the particles.

For conventional limited coalescence processes, any suitable water-immiscible pigment dispersant liquid which will disperse the pigment and binder and is also substantially immiscible with the suspending liquid can be used in the practice of this invention. For the purposes of this invention, "dispersion" includes both suspensions and solutions of the binder. For example, chloromethane, dichloromethane, ethyl acetate, methylene chloride, methanol, benzyl alcohol, N,N-dimethyl glycerol, ehtylene glycol, vinyl chloride, methylethyl ketone, trichloromethane, carbon tetrachloride, ethylene chloride, trichloromethane, toluene, xylene, cyclohexanone, 2-nitropropane and the like, and combinations thereof, are all useful pigment dispersant liquids. Particularly useful dispersants include ethyl acetate and dichloromethane.

Any suitable suspending liquid which is substantially immiscible with the pigment dispersant liquid can be used in the practice of the present method. Water is a particularly useful suspending liquid. Other exemplary water-miscible suspending liquids include lower alcohols (e.g., methanol, ethanol, and propanol), aromatic alcohols (e.g., phenyl alcohol, benzyl alcohol), ketones (e.g., acetone), ethers (e.g., tetrahydrofuran and dioxane), amides (e.g., N,N-dimethylformamide), amines (e.g., morpholine and pyrrolidone), sulfoxides (e.g., dimethyl-sulfoxide), glycerol, ethylene glycol, and other polar suspending liquids. These suspending liquids can be used singly or as mixtures of two or more.

The method of the present invention is applicable to producing particles with a controlled morphology and narrow size distribution from any pigment material that is capable of being uniformly dispersed in a pigment dispersant liquid. The present method is particularly useful to form both organic and inorganic pigment concentrates from binders capable of dissolution in water-immiscible solvents (i.e., pigment dispersant liquids). The organic pigments are preferably non-hydrophilic in nature. Hence, organic pigments that do not contain ionizable groups or undergo hydrogen bonding are expected to be very amenable for use in the method of the present invention. However, any pigment that is insoluble in the suspending and extracting liquids and substantially insoluble in the pigment dispersing liquid can be utilized in the present method. Also, organic pigments that are not highly functionalized with hydrophilic substituents (for the purpose of being compatible with water, e.g., water-based inks) can be used. Exemplary organic pigments include azo pigments, monoazo yellow and orange pigments, diazo pigments, napthol pigments, napthol AS pigments (napthol reds), azo pigment lakes, benzimidazolone pigments, diazo condensation pigments, metal complex pigments, isoindolinone and isoindoline pigments, polycyclic pigments, phthalocyanine pigments (especially an ethyl acetate suspension of a bridged aluminum phthalocyanine, a bromated phthalocyanine, a copper phthalocyanine, an hydroxy aluminum pthalocyanine, a metal-free pthalocyanine, and a milled chlorinated copper pthalocyanine), quinophthalone pigments, indathrone pigments, diacrylide yellow pigments, diazopyrozolione pigments, azo metal pigments, triarylcarbonium pigments (especially a milled ethyl acetate suspension of a sulfonated triphenylmethane, a phosphotungstomolybdic acid laked rhodamine 6G, a phosphomolybdic acid laked rhodamine 6G, a phosphotungstomolybdic acid laked rhodamine B, a phosphotungstomolybdic acid laked rhodamine 3B ethyl ester, a phosphotungstomolybdic acid laked crystal violet, and a phosphomolybdic acid laked crystal violet), laked rhodamine pigments, perylene pigments, quinacridone pigments (especially 2,9-dimethyl quinacridone), and diketopyrrolo pyrrole pigments. Inorganic pigments that have been treated to render them compatible with a polymer or organic solvents can be used in the present method. Preferred inorganic pigments include, but are not limited to, carbon blacks and titanium dioxides. The first dispersion phase can either be blended with a liquid polymer (binder) directly or with a binder comprising a solid polymer binder dissolved in a solvent. The binder solvent can be either the same as or different from the pigment dispersant liquid (as long as the two liquids are mutually miscible). Exemplary hydrophobic binders include olefin homopolymers and copolymers, such as polyethylene, polypropylene, polyisobutylene, and polyisopentylene; polyfluoroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polymethylacrylate, polyethylmethacrylate, and styrene-methylemethacrylate; ethylene-methyl acrylate copolymers, ethylene-ethyl acrylate copolymers, ethylene-ethyl acrylate copolymers, ethylene-ethyl methacrylate copolymers, polystyrene and copolymers of styrene thereof with unsaturated monomers mentioned above, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyryl, polyvinyl acetal, ethylene-vinyl acetate copolymers, ethylene-vinyl alcohol copolymers, and ethylene-allyl copolymers, such as ethylene-allyl alcohol copolymers, ethylene-allyl acetate copolymers, ethylene-allyl acetone copolymers, ethylene-allyl benzene copolymers ethylene-allyl ether copolymers, and ethylene-acrylic copolymers; and polyoxyethylene, polycondensation polymers, such as polyesters, polyurethanes, polyamides, polycarbonates and the like. Especially useful binders include styrene acrylate, styrene methylacrylate (especially styrene 2-methylhexyl methacrylate), styrene butadiene, vinyl toluene acrylate, vinyl toluene methacrylate, vinyl toluene butylacrylate, vinyl toluene butadiene, polyesters, or combinations thereof.

The present method can also be used with inverse limited coalescence systems (i.e., a hydrophilic substance dispersed in a water-miscible pigment dispersant liquid and mixed with a water-immiscible suspending liquid) such as described in U.S. patent application Ser. Nos. 07/888,063 and 08/309,431, to K. D. Lofftus, entitled "INVERSE LIMITED COALESCENCE PROCESSES," filed May 26, 1992 and Sept. 20, 1994, respectively, which disclosures are herein incorporated by reference, for example, in the production of water-based paints, wherein dry pigment concentrates (rather than liquid pigments) can be used to custom blend desired colored paints. The water-miscible and water-immiscible liquids disclosed above are equally useful in inverse limited coalescence systems. In general, inorganic pigments not treated to be hydrophobic and any organic pigment which is highly functionalized with hydrophobic substituents for dispersion in water are amenable for use in the present invention. Inverse limited coalescence methods are particularly applicable to inorganic pigments such as titanates, tungstates, arsenates, antimonates, borates, silicates, ferrocyanides, ferricyanides, sulfides, selenides, carbon blacks, chromites, ferrichromites, alumina chlorites, aluminates, ferrites, oxides, mixed oxides, hydrated oxides, chromates, and hydrated chromates. Especially useful inorganic pigments include carbon black, titanium dioxide, magnetite, and ferric oxide. Especially useful binders include gum arabic, agar, guar gum, polyethylene oxide, polyvinyl alcohol, and polyvinyl carbazole. Dispersants especially useful in inverse limited coalescence systems include water, methanol, benzyl alcohol, N,N-dimethyl formamide, glycerol, and ethylene glycol.

Water-immiscible suspending liquids especially useful in inverse limited coalescence systems include normal, secondary, tertiary, and cyclic alcohols containing at least four carbon atoms, aromatic alcohols, ketones having three or more carbon atoms, halogenated solvents, various esters, aliphatic liquids, or combinations thereof.

The extracting liquid used in the present method can be the same as the suspending liquid (provided it exhibits some mutual miscibility with the pigment dispersant liquid), another liquid which is miscible with the suspending liquid and in which the pigment dispersant liquid has at least 2, preferably 5, wt % miscibility, or a cosolvent having a hydrophilic nature between that of the pigment dispersant liquid and suspending liquid. Any of the water-miscible or water-immiscible substances listed above as useful pigment dispersant liquids and/or suspending agents can be used as the extracting liquid provided it exhibits sufficient mutual miscibility with the pigment dispersant liquid. The extracting liquid must be sufficiently miscible to promote diffusion while not disrupting the stability of the coalesced droplets before they solidify.

A cosolvent can be used when the pigment dispersant liquid and the suspending liquid are not sufficiently miscible to allow diffusion of the pigment dispersant liquid into the suspending liquid or when sufficient extraction of solvent has occurred to prevent destabilization of the dispersion phase droplets by the cosolvent. The choice of cosolvent will depend on the other constituents of the limited coalescence system. Exemplary cosolvents include SOLVESSO 100™, (a mixture of xylenes having a boiling point between 154° and 174° C., available from Exxon, Inc.), butyl alcohol, methyl alcohol, methylethyl ketone, ethyl alcohol, and acetone. A particularly useful cosolvent is methanol because it is least likely to destabilize the coalesced dispersion phase droplets.

A particularly preferred conventional limited coalescence system includes ethyl acetate as the pigment dispersant liquid and water as both the suspending liquid and the extracting liquid.

A particularly preferred inverse limited coalescence system includes water as the pigment dispersant liquid, benzyl alcohol as the suspending liquid, and a combination of benzyl alcohol and isopropyl alcohol as the extracting liquid.

The stabilizers useful in solvent extraction and evaporation limited coalescence processes include silica, metal oxides (e.g., alumina), barium sulfate, barium carbonate, calcium, calcium sulfate, and carbonate calcium phosphate, the latex-based copolymer stabilizers disclosed in U.S. Pat. No. 4,965,131 to Nair et al. and the microgels disclosed in U.S. Pat. No. 4,758,492 to Nair. If a latex-based copolymer stabilizer is used, the stabilizer need not be removed from the particles. Preferred stabilizers include the silica-based stabilizers disclosed in U.S. Pat. No. 4,833,060 to Nair, et al. Particularly useful silica stabilizers include LUDOX™ sold by E. I. du Pont de Nemours & Co. and NALCOAG 1060™ supplied by Nalco Chemical Company.

The particles used as a stabilizer generally have dimensions from about 0.001 μm to about 1 μm, preferably from about 10 to 150 nanometers and most preferably from about 30–100 nanometers. The size and concentration of these particles controls and predetermines the size of the final particle.

If needed, any suitable promoter which is soluble in the suspending liquid and affects the hydrophilic/hydrophobic balance of the stabilizer in the suspension medium may be employed. Exemplary promoters include sulfonated polystyrenes, alginates, carboxymethyl cellulose, tetramethyl ammonium hydroxide or chloride, diethylaminoethylmethacrylate, water-soluble complex resinous amine condensation products such as the water soluble condensation products of diethanoi amine and adipic acid (a particularly suitable promoter of this type is poly(adipic acid-co-methylaminoethanol)), water-soluble condensation products of ethylene oxide, urea and formaldehyde and polyethyleneimine. Other useful promoters include gelatin, glue, casein, albumin, gluten and the like. Nonionic materials such as methoxy cellulose may be used. Generally, the promoter is used in amounts of from about at least 0.2, preferably 0.25 to about 0.6, parts per 100 parts of suspending liquid. As described in U.S. Pat. No. 4,965,131, if a latex-based copolymer stabilizer is used, no promoter is required.

Particles having an average size of from 0.05 μm to 100 μm and preferably from 0.1 μm to 60 μm may be prepared in accordance with the present method. Further details relating to evaporation limited coalescence processes are disclosed in U.S. Pat. Nos. 4,833,060 to Nair et al., and 4,965,131 to Nair et at., the disclosures of which are hereby incorporated by reference.

The various addenda generally present in electrographic toner that can be added to the binder prior to dispersion or in the dispersion itself include charge control agents. Suitable charge control agents are disclosed for example in U.S. Pat. Nos. 3,893,935; 4,079,014; 4,323,634 and British Patent Nos. 1,501,065 and 1,420,839. Charge control agents are generally employed in small quantities such as, from about 0.1 to about 3 wt % and preferably from about 0.2 to about 1.5 wt % based on the weight of the toner. However, in the present invention, the charge agent level is determined by the following ratio: charge agent level multiplied by the weight percent pigment in the concentrate divided by the weight percent pigment in the final toner.

The present invention will now be described in detail by reference to the following Examples that by no means are intended to limit the scope of the invention.

EXAMPLES

Example 1

An ethyl acetate suspension/solution of 90.91% bridged-aluminum phthalocyanine (br-ALPc) (See also U.S. Pat. Ser. No. 4,311,775 for a discussion of br-ALPc) and 9.09% SB polymer (Piccotoner 122™) was milled at 12.5% solids with Solsperse 24000™ as a dispersion aid for 90 minutes residence time in a Netzsch™ media mill and then let down to 14.2% solids in ethyl acetate. A solution of 18.4 g polyester in 120 g of ethyl acetate was added with 100 g of the pigment dispersion. This mixture was suspended in 750 ml of chilled pH 4 buffer containing 1.5 ml LUDOX™ and 0.045 ml of an LC AMAE promoter (a copolymer of adipic acid and methylaminoethanol) and blended using a Silverson™ lab mixer model L4R for 3 minutes at a setting of 5 with a high shear dispersion screen. To this suspension, 2 liters of water was added and after transferring to a larger vessel another 2 liters of water was added. After settling, the water was decanted and the particles recovered by filtration. The particles were washed in place on the filter with 3 batches of 800 ml of water and then dried.

The resulting 40% pigment concentrate was compounded at 2 and 4 pph in polyester polymer with a charge control agent ("CCA") and a low surface adhesion ("LSA") agent on a two roll mill and ground in a jet mill to produce toners. The optical gains of the toners red light transmission density were 545 and 410 $cm^2$·decade/g·% for the 2 and 4 pph pigment levels respectively. This shows an improvement over the observed production values for 4 pph toner of 275 to 300 $cm^2$·decade/g·% for roll milled pigment concentrates. The increased dispersion is observed visually in developed transparencies as a transmission color shift from green to cyan as the dispersion improves. The dispersion in this example produced transparencies with a cyan transmission color (data not shown).

Example 2

A sample of 90.9% br-AlPc and 9.1% polyester media milled for 90 minutes residence in ethyl acetate and let down to 11% solids in ethyl acetate was processed by the SXLC method in four batches to produce a 48.4% cyan pigment concentrate in polyester. Each batch consisted of 600 g of the media milled pigment dispersion and 200 g of a 29% polyester solution in ethyl acetate suspended in 2400 ml of chilled pH 4 buffer containing 4 ml of LUDOX™ and 1.3 ml of 10% AMAE solution and extracted in 3 gallons of chilled water.

This concentrate was extruded with polyester, CCA, and LSA to produce a cyan toner with 2.5 pph br-AlPc. The optical gain of this toner was 380 $cm^2$·decade/g ·% but the transparencies remained green. Roll milling the toner increased the optical gain to 395 $cm^2$·decade/g·% when roll milled at 150° C. and 425 $cm^2$·decade/g·% at 130° C. Additionally, transparencies appeared much nearer to cyan for the roll milled toners. This indicated that the local shear strengthening of the polymer at pigment concentrations of 50% was too great for lower shear devices to achieve dispersion. This was proven in transmission electron microscope ("TEM") thin sections of the toners which showed clusters of pigment particles about 100 nm across (photomicrographs not shown).

Examples 3

A media milled pigment sample of br-AlPc similar to that in Example 2 was let down by SXLC as a 25% pigment concentrate in polyester. This concentrate was extruded at 4 pph in polyester with CCA and LSA to produce a toner. The optical gain of this toner was 380 $cm^2$·decade/g·% and the transparencies appeared cyan indicating good dispersion. Lower gain occurs at higher pigment concentrations and, thus, can not be compared directly.

Example 4

A media milled sample of alkali blue pigment (color index Pigment Blue 61) (a sulfonated triphenylmethane, a tricarbonium-type pigment) in an ethyl acetate solution of Piccotoner 122™ was stabilized by adding a solution of Solsperse 24000™. A 50% pigment concentrate was made from this by SXLC as in Example 2 except with 5 ml LUDOX™ and 1.5 ml 10% AMAE solution. This concentrate was made into a toner by compounding on a roll mill at 1 pph pigment with an SB polymer and CCA. The optical gain of these toners were 492 $cm^2$·decade/g·% at 1% loading compared to 227 $cm^2$·decade/g·% for a toner made with straight pigment at 3% loading.

Example 5

Four batches of chlorinated copper phthalocyanine green pigment (color index Pigment Green 7) were media milled for 60 minutes residence time in an Eiger™ mill at 15% solids of 50% pigment in a Piccotoner 122™-ethyl acetate solution. These batches were mixed and blended for 30 minutes using a Silverson™ lab mixer with a Piccotoner 122™-ethyl acetate solution resulting in 6.2 kg at 25% solids of 17% pigment. This solution/suspension was added to 17 kg of pH 4 buffer containing 5 g of 100% AMAE and 75 ml NALCOAG 1060™ and stirred with a blade impeller for 20 minutes and then pumped into approximately 30 gallons of chilled water using a centrifugal pump having a ball valve that was used to throttle the flow to about one quarter of the maximum flow rate. After stirring for 6.5 hours, the pigment concentrate was allowed to settle overnight and the majority of water decanted. The sample was washed three times by filtering and resuspending in 3 gallons of water for 10 minutes. After a final filtration, the sample was dried at 40° C. and 26 inches vacuum for 40 hours. The resulting particles had a considerable amount of particles below 10 microns in diameter. This example shows that the use of shearing energy that is sufficient to produce desired pigment particles, while minimizing the production of fines.

Example 6

Six 1 kg batches of copper phthalocyanine blue pigment (color index Pigment Blue 15:3) were milled in a Sweco™ shaker for 24 hours at 15% solids of 50% pigment in a Piccotoner 1221™-ethyl acetate solution. These batches were processed as in Example 5 except that 8.2 kg of solution/suspension with 20% solids of 25% pigment and 24 kg of buffer with 7.5 g of AMAE and 115 ml NALCOAG 1060™ were used. Additionally, the suspension was stirred for only 10 minutes before pumping into 40 gallons of chilled water at more than one half the maximum flow rate. The pigment concentrate was stirred for 1.5 hours and allowed to settle for 5 hours after which the water was decanted and the sample filtered, washed, and dried as in Example 5. The resulting particles had acceptable amount of fine particles.

The invention has been described in detail with particular reference to certain preferred embodiments thereof, but it will be understood that variations or modifications can be effected within the spirit and scope of the invention as described hereinabove and as defined in the appended claims.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method of making pigment concentrate particles comprising a pigment uniformly dispersed in a polymer and having a controlled morphology and narrow particle size distribution, comprising the steps of:

dispersing sub-micron sized pigment particles in a pigment dispersant liquid to form a first dispersion phase;

blending said first dispersion phase with a binder to produce a second dispersion phase;

mixing said second dispersion phase under sufficient shear to produce a suspension of small dispersion phase droplets in an immiscible suspending liquid, wherein said suspending liquid and said second dispersion phase are sufficiently immiscible to form two phases and said suspension contains a stabilizer which limits said dispersion phase droplets' coalescence;

allowing said small dispersion phase droplets in said suspension to coalesce to a larger size at which substantially no further coalescence can occur;

mixing said suspension of coalesced droplets with an amount of an extracting liquid sufficient to remove said pigment dispersant liquid from said coalesced droplets, wherein said extracting liquid is sufficiently miscible with said second dispersion phase to promote diffusion of said pigment dispersant liquid from said coalesced droplets, but immiscible enough with said second dispersion phase as to not disrupt the stability of said coalesced droplets;

whereby said droplets form substantially solidified pigment concentrate particles having a controlled morphology and narrow particle size distribution; and isolating said pigment concentrate particles.

2. A method according to claim 1, wherein said isolating comprises separating and drying said pigment concentrate particles.

3. A method according to claim 2, wherein said separating is by filtration.

4. A method according to claim 2, wherein said separating is by sedimentation.

5. A method according to claim 2, wherein said separating is by flotation.

6. A method according to claim 5, wherein said flotation comprises a counter-current plug flow process utilizing flotation columns.

7. A method according to claim 1, wherein said pigment dispersant liquid and said binder are selected from the group consisting of ethyl acetate, methylene chloride, methanol, benzyl alcohol, N,N-dimethyl glycerol, ethylene glycol, or a combination thereof, and said suspending liquid is water.

8. A method according to claim 1, wherein said pigment is an organic pigment.

9. A method according to claim 8, wherein said organic pigment is selected from the group consisting of a phthalocyanine, an isoindoline, an indathrone, a triaryl carbonium, an azo pigment lake, a diacrylide yellow, a diazopyrozolione, a laked rhodamine, a perylene, a quinacridone, and an azo metal.

10. A method according to claim 9, wherein said phthalocyanine is selected from the group consisting of a ethyl acetate suspension of a bridged aluminum phthalocyanine, a bromated phthalocyanine, a copper phthalocyanine, an hydroxy aluminum pthalocyanine, a metal-free pthalocyanine, and a milled chlorinated copper pthalocyanine.

11. A method according to claim 9, wherein said triarylcarbonium is selected from the group consisting of a milled ethyl acetate suspension of a sulfonated triphenylmethane, a phosphotungstomolybdic acid laked rhodamine 6G, a phosphomolybdic acid laked rhodamine 6G, a phosphotungstomolybdic acid laked rhodamine B, a phosphotungstomolybdic acid laked rhodamine 3B ethyl ester, a phosphotungstomolybdic acid laked crystal violet, and a phosphomolybdic acid laked crystal violet.

12. A method according to claim 1, wherein said binder is selected from the group consisting of a styrene acrylate, a styrene butadiene, a vinyl toluene butadiene, a polyester, and combinations thereof.

13. A method according to claim 1, wherein said extracting liquid is chosen from the group consisting of a liquid the same as said suspending liquid, a liquid miscible with said suspending liquid that has a mutual miscibility with said pigment dispersant liquid, or a cosolvent which is miscible in both said pigment dispersant liquid and said suspending liquid.

14. A method according to claim 1, wherein the amount of said stabilizer is adjusted to produce an average particle size of from about 3 up to about 60 microns.

15. A method according to claim 1, wherein the amount of said stabilizer is adjusted to produce an average particle size of from between about 20 up to about 40 microns.

16. A method according to claim 1, wherein said second dispersion phase comprises at most 60 weight percent of pigment.

17. A product produced by the method of claim 1.

18. A method according to claim 1, wherein said dispersing comprises milling said pigment in said pigment dispersing liquid.

19. A method according to claim 1, wherein said pigment is an inorganic pigment.

20. A method according to claim 19, wherein said inorganic pigment is selected from the group consisting of titanates, tungstates, arsenates, antimonates, borates, silicates, ferrocyanides, ferricyanides, sulfides, selenides, carbon blacks, chromites, ferrichromites, alumina chlorites, magnetites, aluminates, ferrites, oxides, mixed oxides, hydrated oxides, chromates, and hydrated chromates.

21. A method according to claim 1, wherein said pigment dispersant liquid and said binder are selected from the group consisting of water, methanol, benzyl alcohol, N,N-dimethyl formamide, glycerol, N,N-dimethyl glycerol, ethylene glycol, and combinations thereof, and said suspending liquid is selected from the group consisting of normal, secondary, tertiary, and cyclic alcohols containing at least four carbon atoms, aromatic alcohols, ketones having three or more carbon atoms, halogenated solvents, esters, aliphatic liquids, and combinations thereof.

22. A method according to claim 1, wherein said binder is selected from the group consisting of water, methanol, benzyl alcohol, N,N-dimethyl formamide, glycerol, N,N-dimethyl glycerol, ethylene glycol, and combinations thereof, and said suspending liquid is selected from the group consisting of normal, secondary, tertiary, and cyclic alcohols containing at least four carbon atoms, aromatic alcohols, ketones having three or more carbon atoms, halogenated solvents, esters, aliphatic liquids, and combinations thereof.

23. A method according to claim 1, wherein said binder is chosen from the group consisting of gum arabic, agar, guar gum, polyethylene oxide, polyvinyl alcohol, and polyvinyl carbazole.

* * * * *